July 21, 1936.   E. D. TILLYER ET AL   2,048,304
OPHTHALMIC LENS
Filed Dec. 12, 1930   2 Sheets-Sheet 1
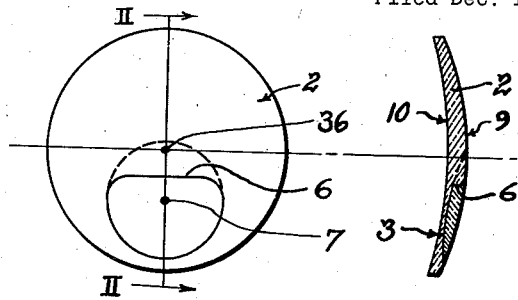
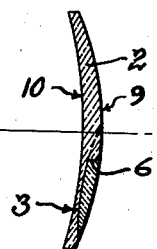
Fig. I.   Fig. II.   Fig. III.
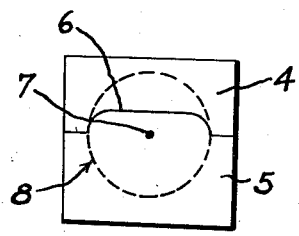
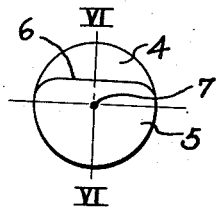
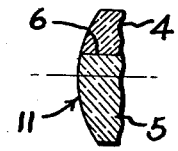
Fig. IV.   Fig. V.   Fig. VI.
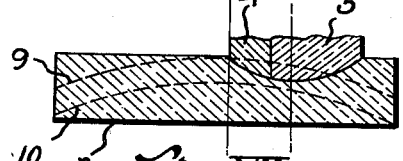
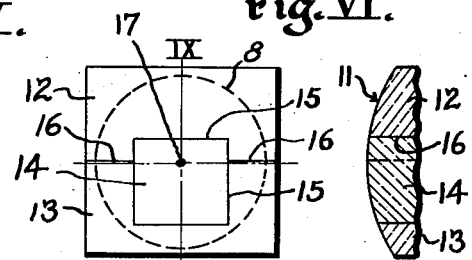
Fig. VII.   Fig. VIII.   Fig. IX.
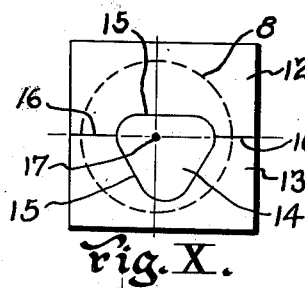
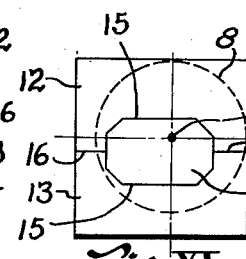
Fig. X.   Fig. XI.   Fig. XII.
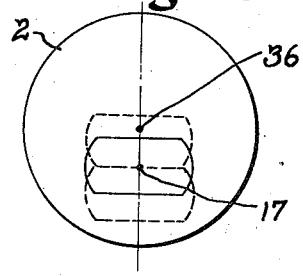
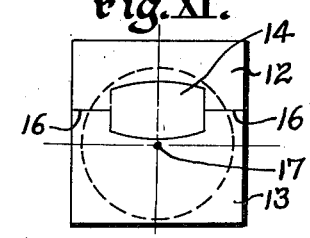
Fig. XIV.   Fig. XIII.
INVENTOR
EDGAR D. TILLYER.
HARRY W. HILL.
BY Harry H. Still
ATTORNEY July 21, 1936.  E. D. TILLYER ET AL  2,048,304
OPHTHALMIC LENS
Filed Dec. 12, 1930  2 Sheets-Sheet 2
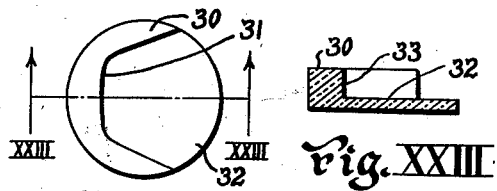
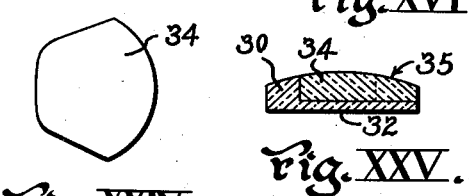
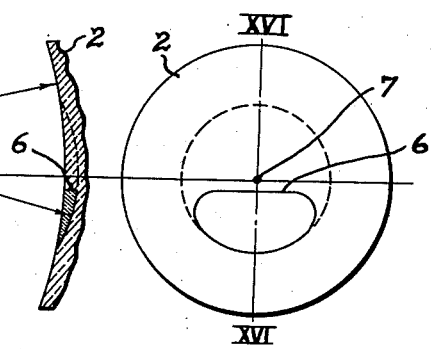
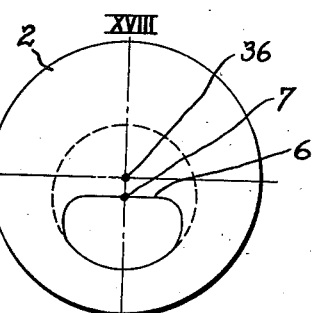
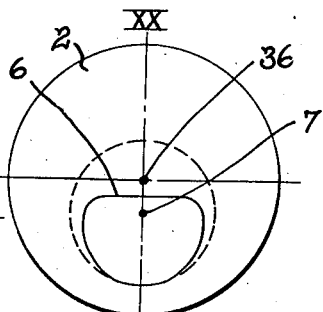
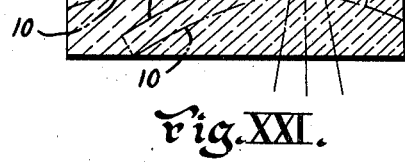
INVENTOR
EDGAR D. TILLYER.
HARRY W. HILL.
BY Harry H. Stull.
ATTORNEY Patented July 21, 1936

2,048,304

UNITED STATES PATENT OFFICE 2,048,304

OPHTHALMIC LENS

Edgar D. Tillyer and Harry W. Hill, Southbridge, Mass., assignors to American Optical Company, Southbridge, Mass., a voluntary association of Massachusetts Application December 12, 1930, Serial No. 501,867

3 Claims. (Cl. 88—54)

This invention relates to improvements in ophthalmic lenses and has particular reference to an improved bifocal or multifocal lens and process of making same.

The principal object of the invention is to provide improved and less expensive means of producing lenses embodying fusion processes, by substituting molding processes for certain of the more expensive grinding and polishing operations hitherto employed without detracting from the excellence of the finished lenses.

Another object of the invention is the production of a fused multifocal or bifocal lens wherein the objectionable and harmful edge reflections of the fused segment are maintained at a minimum.

Another object of the invention is to provide improved means for producing a fused bifocal or multifocal lens embodying the use of molding operations for forming the segment and the segment recess so that either a feather or thin edge segment or a thick edge segment may be used.

Another object of the invention is to provide improved means for making a molded segment button having reinforcement so located that the optical properties of the glass material is not destroyed in the molding, pressing or fusing operations.

Another object of the invention is to provide improved and less expensive means of producing a segmental button for a fused bifocal or multifocal lens.

Another object of the invention is to provide improved means of making a segment for a fused multifocal or bifocal lens of irregular or unsymmetrical shape or contour.

Other objects are the provision of means for controlling the size, shape and optical center of the segments of such lenses, for controlling the position of the dividing line of the segment, for controlling the amount and position of prism correction in the segment, for reducing the cost and difficulty of fusing the dividing line, for utilizing the combinations of the prior art as regards glasses of different indices of refraction, dispersion and expansion and for obtaining all of the various prior art advantages of lenses of this character by simpler and less expensive means.

Other objects and advantages of this invention will become apparent from the following description taken in connection with the accompanying drawings and it will be understood that many changes may be made in the details of construction, arrangement of parts and the steps of the process without departing from the spirit of the invention as expressed in the accompanying claims. We, therefore, do not wish to be limited to the exact details of construction and steps of the process shown and described as the preferred forms only have been given by way of illustration.

Referring to the drawings:

Fig. I is a front elevation of a finished lens embodying the invention.

Fig. II is a section on line II—II of Fig. I;

Fig. III is an enlarged sectional view of a semifinished lens blank showing a step in the process of manufacture;

Fig. IV is a front elevation of the blank for the reading addition showing a step in the process of manufacture;

Fig. V is a front elevation of the segment for the reading addition illustrating a further step in the process of manufacture;

Fig. VI is a sectional view taken on line VI—VI of Fig. V;

Fig. VII is an enlarged sectional view showing the segment illustrated in cross section in Fig. VI positioned within the countersink in the major portion of the lens and illustrating in dotted lines how the finished lens is formed from this major blank;

Fig. VIII is a front elevation similar to that shown in Fig. IV, but illustrating a modified form of the invention;

Fig. IX is a sectional view taken on line IX—IX of Fig. VIII;

Fig. X is a view similar to Fig. VIII showing another modified form of the invention;

Fig. XI is a view similar to Fig. X showing another modified form of the invention;

Fig. XII is a view similar to Fig. XI showing a further modification of the invention;

Fig. XIII is a view similar to Fig. XII showing a still further modification of the invention;

Fig. XIV is a diagrammatic view illustrating how the position of the reading addition may be varied with respect to the center of the distance portion or major portion of the lens;

Fig. XV is a front elevation of a lens showing the centers monaxially arranged and the dividing line between the distance and reading fields positioned below the center of said fields;

Fig. XVI is a sectional view taken on line XVI—XVI of Fig. XV;

Fig. XVII is a view similar to Fig. XV showing the center of the distance field above the center of the reading field and showing the dividing line between the two fields as lying on the center of said reading field;

Fig. XVIII is a sectional view taken on line XVIII—XVIII of Fig. XVII;

Fig. XIX is a view similar to Fig. XV showing the centers of the reading and the distance fields positioned one above the other and showing the dividing line between the said reading and distance fields lying between the centers of said fields;

Fig. XX is a sectional view taken on line XX—XX of Fig. XIX;

Fig. XXI is an enlarged sectional view illustrating in dotted lines a process by which the center of the reading addition or inserted segment can be controlled during the formation or grinding of the finished curves upon the lens;

Fig. XXII is a front elevation of a further modification of the blank for the reading addition;

Fig. XXIII is a section on line XXIII—XXIII of Fig. XXII;

Fig. XXIV is a front elevation of a further modification of the segment for the reading addition;

Fig. XXV is a section through the composite button;

Fig. XXVI is a sectional view showing the composite button fused in the countersink in the major portion of the lens; and Fig. XXVII is a view similar to Fig. XXVI showing the segment side of the lens finished with a continuous curve.

In the past fused bifocal or multifocal lenses have been made with very desirable and efficient segments having a substantially straight upper edge and a circular lower contour. These segments were made of two pieces of glass of different indices of refraction fused along the so called straight edge of the segment but great difficulty was found in the fusing of this edge. The percentage of waste was exceedingly high and the quality of the fused edge very poor. It is therefore one of the prime objects of this invention to provide means whereby this fusing difficulty is avoided.

There have also been produced in the prior art two types of fused lenses of this character one having the lower circular portion of the segment of a knife or feathered edge and the other having the said edge of an appreciable thickness. Our invention may be employed with equal facility for either type of lens described.

Referring to the drawings wherein similar reference characters denote corresponding parts throughout: In Figures I to VII inclusive we have shown our invention as applied to the production of a segment for a fused multifocal or bifocal lens having its lower circular outline of the thin or feathered edge type. In Figures VIII to XIII inclusive we have shown it applied to a segment having said outline of an appreciable thickness. The other figures represent either one or the other of these types.

In Fig. I we have shown a lens having the major portion 2 preferably of crown or other glass having a low index of refraction. In this major portion 2 we grind and finish the countersink curve 3, see Fig. III. This curvature is finished to an optical surface and is of a radius such as to produce the required power as in prior art lenses. We make the button portion in two pieces namely 4 of glass of the same index of refraction as the major portion 2, and 5 of a glass of a different index of refraction, preferably of a high index of refraction such as flint glass or a barium glass. The top edge 6 of the portion 5 is shaped to the desired line of the top edge of the segment. The lower edge of the part 4 is shaped to fit around the shaped edge 6. These two pieces 4 and 5 are then fused together. We then locate the desired position 7 of the optical center of the segment and strike the circle 8 about the center 7 to give the outline of the button. The blank is cut on the line 8 and the countersink curve 11 of the button, which is a curve on an axis passing through the center 7 is ground and finished to an optical surface which produces a button as shown in Figs. V and VI. This button is placed in the countersink 3, the surface 11 in contact with the surface 3. The parts are then fused together as shown in Fig. VII. The segment side of the blank is finished to an optical power surface 9, and the other side to an optical power surface 10 to produce the finished lens shown in Fig. II.

It will be noted that the line 6 may be shaped to practically any desired contour and that this shape will be kept throughout all the operations of production. An irregular contour line 6 of a shape that is difficult or even impossible to grind may be formed in this way, and a long fusing surface for the line 6 may be provided. It will also be noted that the circular line 8 of the segment has a thin or feather edge. This feather edge is desirable in a finished lens as there are less reflections of light from such an edge than there are from a thick edge. This absence of reflections is a desirable consideration in the greater number of finished lenses that are provided for the market and is not departed from unless for some other special requirement not obtainable with the thin edge segment as will be pointed out hereinbelow.

In the structures shown in Figs. VIII to XIII inclusive a three part button is produced. The parts 12 and 13 are of glass of sensibly the same index of refraction as the major portion 2, and the segment 14 is of glass of a different index of refraction preferably of a high index of refraction such as flint or barium glass.

The object of this construction is to enable the use of irregular or odd shaped segments difficult if not impossible to grind as well as a segment having an edge with an appreciable thickness all around. The parts 12 and 13 are shaped to fit together on the line 16 as well as to fit around the edge 15 of the segment 14. The position 17 of the optical center of the segment is determined and located and the circle 8 struck from the center 17. The parts are fused together and cut on the line 8. The underside 11 is then surfaced as described above. This button is then placed in the countersink as described above and fused therein. In this way many various shapes of segments may be obtained some of which are shown in Figs. VIII and X to XIII inclusive.

It will be noted that the circle line 8 does not strike the segment line 15 hence the segment in the button will have edges of an appreciable thickness. Segments with thick edges are of use where it is desired to introduce a prism correction into the segment. Such segments too maintain their size and shape during the surfacing of the segment face of the lens until such edges have been ground through. Hence no outside control of the size and shape of the segment is needed other than not to grind entirely through the thickness of the segment. Where segments with thin edges are used an outside control by the operator is necessary but is well understood and largely employed in the prior art.

A third method of making the button is shown in Figs. XXII to XXVII inclusive. A piece 30 of glass of sensibly the same index of refraction as the major portion 2 has compressed or moulded therein while in a plastic condition from heat treatment the outline shape 31 of the segment. On the bottom of the piece 30 is left a web section 32. This web is left to provide a support or backing to the piece 30 when the die having the shape of the segment is pressed into the glass. It provides a place for the displaced glass to flow and insures that the edge 33 is clean cut and smooth and that the glass adjacent the edge 33 is homogeneous and without compression striae and without compression strata of different densities and that the lower edge of the compressed portion is clear cut and not deflected as it would be if there were no web 32 to take care of the displaced material. It has been found that the edge 33 when moulded or pressed as described above is clear and smooth and that it provides a good fusion surface, in fact the fusion has been found to be not only less expensive but superior to that of fusing a fitted ground and polished edge as was done in the prior art. This compressing of the segment shape in the button as may be readily seen is considerably cheaper than the previous grinding and polishing operations. The segment 34 may be moulded to shape or it may be cut and finished. The moulded segment is considerably less expensive and has been found to give good results. The segment 34 is placed in the recess 31 in the piece 30 and the parts fused together. The segment 34 is of flint or barium glass or a similar glass of high index of refraction.

After the parts 30 and 34 have been fused together the under surface 35 which is the side opposite the web 32 is finished to the desired countersink curvature to produce the required power. The composite button is then placed in the countersink 3 with the surface 35 engaging the countersink surface and the parts fused together as shown in Fig. XXVI. During the fusing of the composite button into the countersink of the major blank the web 32 protects the segment 34 and prevents warping etc. during the fusing operations.

The lens surfaces 9 and 10 are finished as has been previously described with the other forms of buttons.

The relationship of the optical center of the segment to the center of the major blank may be regulated as desired. In Figs. XV and XVI the optical center 7 or 17 of the segment is located at the center of the major blank. In Figs. XVII and XVIII the optical center 7 is below the center 36 of the major blank and on the dividing line between the segment and the major blank. In Figs. XIX and XX the optical center 7 of the segment is below the center 36 of the major blank and also below the dividing line between the segment and major blank. This relationship can be arranged as desired as well understood in the prior art. The centers can also be placed to either side of the vertical center line of the lens as shown in Figs. X and XI. The dividing line too can be placed as desired as well known in the prior art as illustrated in Fig. XIV.

Any combinations of glass known to the prior art may be used, keeping in mind the index of refraction for power, the dispersion for color considerations, the melting temperatures for fusion and the expansion for fusion.

The amount and position of prism correction is controlled by means of the angular relationship of the curve 9 to the segment as illustrated in Fig. XXI. The position of the optical center with relation to the center of the major blank is controlled in this way. This practice is well known in the prior art.

By referring to Fig. XXII it is clear that a composite button may be made to the outline shape of the button without a cutting operation such as shown in Fig. IV and in Figs. VIII to XIII inclusive, constituting a saving of considerable time and cost of production.

It will be understood that in all instances the portion of the button which is of sensibly the same index of refraction as the major portion will blend with the said major portion when fused thereto and disappear leaving only the portion of a different index of refraction visible.

The shapes set out in the drawings are simply by way of illustration of how various shaped segments can be obtained and how segments of varying sizes may be obtained and are not intended to restrict applicant in any way to the particular shape or size of segment shown.

As stated above the center of the reading addition may be placed in any desired relation with respect to the center 36 of the major portion 2 and the dividing line 6 may be located in any desired relation with respect to the center 36 of the distance portion and the center 17 of the reading addition.

It will be understood that wherever the term "multi-focal" is employed in the specification or claims herein, that it refers to a bifocal lens as well as other lenses having more than one focal field. It will also be understood that the use of the invention and device described herein will be mainly in connection with bifocal lenses, the greater bulk of the lenses to which this invention will be applied being bifocal lenses; only a small percentage will be trifocals or lenses of more than two focal fields.

From the foregoing it will be seen that there have been provided simple, efficient and economical means for obtaining all of the advantages of the invention.

Having described our invention we claim:—

1. A blank for an ophthalmic lens comprising a major portion of glass of one index of refraction having a countersink therein and a composite button supported in said countersink, said composite button comprising a portion of glass of sensibly the same index of refraction as the major portion and having a recess therein extending from the internal portion of the glass out to a marginal edge thereof and having a web portion in said recess, and a segment of glass of a different index of refraction fitted in said recess between the web and major portion of glass with one of its edges abutting the internal edge of the portion having the recess therein, a surface engaging the surface of the web in the recess and a surface engaging the surface of the countersink and having the outline shape of the recess.

2. A blank for a fused ophthalmic lens comprising a major portion of glass of one index of refraction having a spherical countersink recess therein, a composite button fused in said countersink and a continuous optical surface over said major portion and composite button intersecting the curve of the countersink, said composite button comprising a portion of glass of sensibly the same index of refraction as the major portion and a portion of glass of a different index of refraction fitted together edge to edge on a comating line of division, the piece of glass of sensibly the same index of refraction as the major portion having a part along its edge forming the comating line of division indented with respect to the remainder of said edge, said indentation having a central portion extending in a direction transversely of the blank and angularly deflected opposed end portions which depart from the general shape of the central portion, and the other piece of glass of said composite button having a projection complementary to said indentation, said complementary edges being adapted to complete the outline of the top portion of the segment and the remainder of the outline being formed by the intersection of the countersink curve by said continuous optical surface over said major portion and composite button.

3. A blank for a fused ophthalmic lens comprising a major portion of glass of one index of refraction having a spherical countersink recess therein, a composite button fused in said countersink and a continuous optical surface over said major portion and composite button intersecting the curve of the countersink, said composite button comprising a portion of glass of sensibly the same index of refraction as the major portion and a portion of glass of a different index of refraction fitted together edge to edge on a comating line of division, the piece of glass of sensibly the same index of refraction as the major portion having a part along its edge forming the comating line of division indented with respect to the remainder of said edge, said indentation having a central portion extending in a direction transversely of the blank and terminating in opposed curved end portions which depart from the general shape of the central portion, and the other piece of glass of said composite button having a projection complementary to said indentation, said complementary edges being adapted to complete the outline of the top portion of the segment and the remainder of the outline being formed by the intersection of the countersink curve by said continuous optical surface over said major portion and composite button.

EDGAR D. TILLYER.
HARRY W. HILL.